United States Patent
Horner (10) Patent No.: US 12,547,862 B1
(45) Date of Patent: Feb. 10, 2026

(54) SYSTEMS AND METHODS TO IDENTIFY BARCODES OF INTEREST USING A NON-INTERNET CONNECTED BARCODE SCANNER

(71) Applicant: Zebra Technologies Corporation, Lincolnshire, IL (US)

(72) Inventor: Matthew Lawrence Horner, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/935,430

(22) Filed: Nov. 2, 2024

(51) Int. Cl.
  *G06K 7/10* (2006.01)
  *G06K 7/14* (2006.01)

(52) U.S. Cl.
  CPC ....... *G06K 7/1413* (2013.01); *G06K 7/10881* (2013.01)

(58) Field of Classification Search
  CPC ..... G06K 2007/10524; G06K 7/10821; G06K 7/1417; G06K 7/1434
  USPC .......................... 235/462.11, 462.45
  See application file for complete search history.

(56) References Cited

U.S. PATENT DOCUMENTS

| | | | |
|---|---|---|---|
| 2009/0254460 A1* | 10/2009 | Farmer | G06Q 10/087 705/28 |
| 2010/0106660 A1* | 4/2010 | Farmer | G06Q 30/0185 705/318 |

* cited by examiner

*Primary Examiner* — Paultep Savusdiphol
(74) *Attorney, Agent, or Firm* — Yuri Astvatsaturov (57) ABSTRACT

Systems and methods for identifying specific GS1 Digital Link barcodes using non-internet-connected barcode readers. The system includes a server executing a device-management application and a barcode reader with local processor and memory. The barcode reader stores payloads of interest from the server and scans GS1 Digital Link barcodes to decode their payloads. If a decoded payload matches a stored payload, the barcode reader generates a first response, while non-matches generate a second response. Configuration can occur via data transfer or a configuration barcode. The system enables precise barcode identification without real-time internet access, aiding applications in recall management and inventory control.

23 Claims, 4 Drawing Sheets

SYSTEMS AND METHODS TO IDENTIFY BARCODES OF INTEREST USING A NON-INTERNET CONNECTED BARCODE SCANNER

BACKGROUND

The use of barcodes within various industries like retail, manufacturing, logistics, healthcare, and others has persisted for many years and has allowed users to quickly and efficiently obtain data related to the items that are associated with those barcodes. In many instances, however, barcodes are not unique. Taking the retail sector as an example, the barcode format most often used there is a Global Trade Item Number (GTIN) in one of several structures (e.g., GTIN-8, GTIN-12, GTIN-13, GTIN-14). In general, each of these structures includes a check digit, a company prefix, and a reference number (in case of GTIN-14 it also includes an indicator), with the combination of the company prefix and the reference number allowing for the user to identify an item as a particular item from a particular company.

While this is useful in many instances, it lacks the ability to distinguish between individual items of the same kind. For example, two packages of the same meat packaged by the same manufacturer will have the same GTIN, preventing the user from being able to tell one apart from the other. While not problematic in most cases, there are times when specific instances of items need to be identified. Events like safety recalls may require venue operators to set aside specific products that may have been manufactured within certain batches. Not having a way to distinguish between items of the same kind can lead to the need to set aside all available items rather than those that are affected, creating waste and leading to economic loss.

This issue may be addressed by the use of Global Standards 1 (GS1) Digital Link barcodes. However, these barcodes are expected to be scanned and decoded by devices with real-time access to the internet, and a large number of barcode readers do not have such capability. Accordingly, there is a need for systems, methods, and devices which enable a non-internet-connected barcode reader to identify individual barcodes pursuant to a predetermined criteria.

SUMMARY

In an embodiment, a present disclosure describes a system for identifying GS1 Digital Link barcodes of interest, comprising: a server configured to execute a device-management application; and a barcode reader having a local processor and a local memory, the barcode reader being configured to decode a GS1 Digital Link barcode to obtain a payload, wherein: the barcode reader is operable to be managed by the device-management application; the barcode reader receives, from the device-management application, a list of payloads of interest to be stored in the local memory of the barcode reader, each of the payloads of interest being associated with one of the GS1 Digital Link barcodes of interest; responsive to decoding a GS1 Digital Link barcode present in an image captured by the barcode reader and determining that a decoded payload of the GS1 Digital Link barcode present in the image matches one of the payloads of interest, generating a first response; responsive to decoding the GS1 Digital Link barcode present in the image captured by the barcode reader and determining that the decoded payload of the GS1 Digital Link barcode present in the image does not match one of the payloads of interest, generating a second response; the determining if the decoded payload of the GS1 Digital Link barcode present in the image matches or does not match one of the payloads of interest is done by comparing the decoded payload of the GS1 Digital Link barcode present in the image to the list of payloads of interest stored in the local memory of the barcode reader by the local processor.

In another embodiment, the present disclosure describes a system for identifying GS1 Digital Link barcodes of interest, comprising: a server configured to execute a device-management application; and a barcode reader having a local processor and a local memory, the barcode reader being configured to decode a GS1 Digital Link barcode to obtain a payload, wherein: the barcode reader is operable to be managed by the device-management application; the barcode reader receives, from the device-management application, a dataset having one or more entries to be stored in the local memory of the barcode reader, the dataset being associated with the GS1 Digital Link barcodes of interest such that for each one of the GS1 Digital Link barcodes of interest the dataset includes an entry having at least a portion of a payload of the respective one of the GS1 Digital Link barcodes of interest; responsive to decoding a GS1 Digital Link barcode present in an image captured by the barcode reader and determining that at least a portion of a decoded payload of the GS1 Digital Link barcode present in the image matches the one or more entries of the dataset, generating a first response; responsive to decoding the GS1 Digital Link barcode present in the image captured by the barcode reader and determining that the at least the portion of the decoded payload of the GS1 Digital Link barcode present in the image does not match the one or more entries of the dataset, generating a second response; the determining if the at least the portion of the decoded payload of the GS1 Digital Link barcode present in the image matches or does not match the one or more entries of the dataset is done by comparing the at least the portion of the decoded payload of the GS1 Digital Link barcode present in the image to the entries of the dataset stored in the local memory of the barcode reader by the local processor.

In still another embodiment, the present disclosure describes a barcode reader for identifying GS1 Digital Link barcodes of interest, the barcode reader being configurable via a device-management application executing on a server, the barcode reader comprising: a local processor; and a local memory, the barcode reader being configured to decode a GS1 Digital Link barcode to obtain a payload, wherein: the barcode reader is operable to be managed by the device-management application; the barcode reader receives, from the device-management application, a dataset having one or more entries to be stored in the local memory of the barcode reader, the dataset being associated with the GS1 Digital Link barcodes of interest such that for each one of the GS1 Digital Link barcodes of interest the dataset includes an entry having at least a portion of a payload of the respective one of the GS1 Digital Link barcodes of interest; responsive to decoding a GS1 Digital Link barcode present in an image captured by the barcode reader and determining that at least a portion of a decoded payload of the GS1 Digital Link barcode present in the image matches the one or more entries of the dataset, generating a first response; responsive to decoding the GS1 Digital Link barcode present in the image captured by the barcode reader and determining that the at least the portion of the decoded payload of the GS1 Digital Link barcode present in the image does not match the one or more entries of the dataset, generating a second response; the determining if the at least the portion of the decoded payload of the GS1 Digital Link barcode present in the image matches or does not match the one or more entries of the dataset is done by comparing the at least the portion of the decoded payload of the GS1 Digital Link barcode present in the image to the entries of the dataset stored in the local memory of the barcode reader by the local processor.

In still yet another embodiment, the present disclosure describes a method for identifying GS1 Digital Link barcodes of interest using a barcode reader, the method comprising: receiving, by the barcode reader from a device-management application, a dataset having one or more entries and storing the data in a local memory, the dataset being associated with GS1 Digital Link barcodes of interest, wherein each entry includes at least a portion of a payload of a respective GS1 Digital Link barcode of interest; configuring the barcode reader via the device-management application executing on a server; decoding, by a local processor of the barcode reader, a GS1 Digital Link barcode captured in an image to obtain a payload; determining if at least a portion of the decoded payload of the GS1 Digital Link barcode captured in the image matches one or more entries of the dataset by comparing the decoded payload to the entries stored in the local memory; generating a first response if the portion of the decoded payload matches the one or more entries of the dataset; and generating a second response if the portion of the decoded payload does not match the one or more entries of the dataset.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
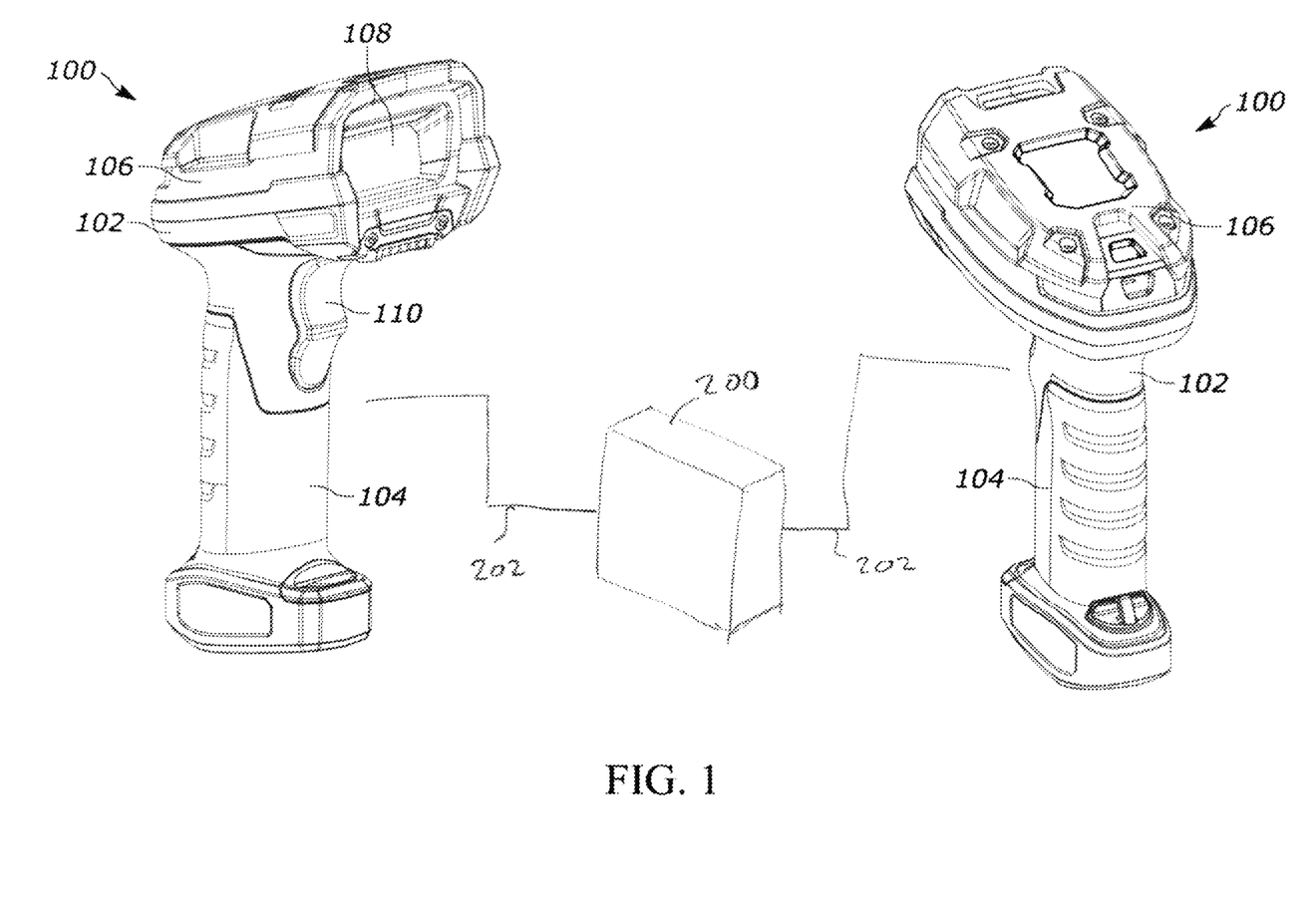
FIG. 1 illustrates a perspective front and back view of an optical imaging reader (also known as a barcode reader) in accordance with an embodiment.
Figure 2:
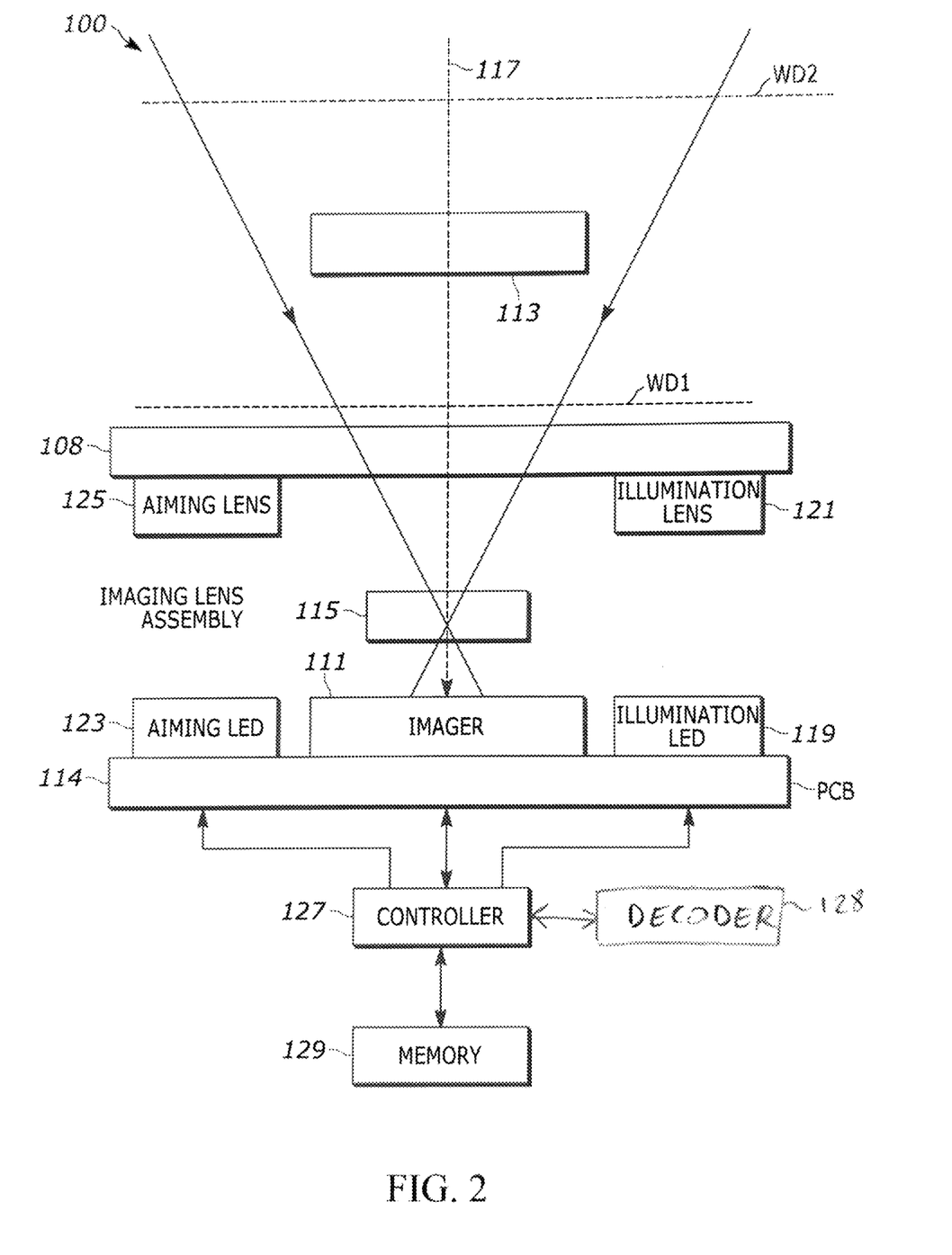
FIG. 2 illustrates a schematic block diagram of various components of the reader of FIG. 1 in accordance an embodiment.

FIGS. 1 and 2 are exemplary embodiments of an optical imaging reader 100 (also referred to as a barcode reader) and the components thereof. The exemplary barcode reader 100 includes a housing 102 with a handle portion 104, also referred to as a handle 104, and a head portion 106, also referred to as a scanning head 106. The head portion 106 includes a window 108, and is configured to be positioned on the top of the handle portion 104. The handle portion 104 is configured to be gripped by a reader user (not shown) and includes a trigger 110 for activation by the user. Optionally included in an embodiment is also a base (not shown), also referred to as a base portion, that may be attached to the handle portion 104 opposite the head portion 106, and is configured to stand on a surface and support the housing 102 in a generally upright position. The barcode reader 100 can be used in a hands-free mode as a stationary workstation when it is placed on a countertop or other workstation surface. The barcode reader 100 can also be used in a handheld mode when it is picked up off the countertop or base station, and held in an operator's hand. In the hands-free mode, products can be slid, swiped past, or presented to the window 108 for the reader to initiate barcode reading operations. In the handheld mode, the barcode reader 100 can be moved towards a barcode on a product, and the trigger 110 can be manually depressed to initiate imaging of the barcode. Once activated, the reader 100 captures image data and attempts to decode barcodes (also referred to as indicia) that are present therein. Upon successfully decoding the payload of the one or more barcodes in the image data, that payload is typically transmitted to a host 200 (like, for example, a point of sale workstation, a backend server, or a general purpose computer/processor) for further processing. This transmission may be via a direct/wired connection 202, a wireless connection, or a hybrid where an intermediate device like a barcode reader cradle receives a wireless signal from the reader 100 and then transmits the data from that signal downstream to the processor 200 via a wired connection. It should be appreciated that in instances of using a cradle for the readers, this cradle may be seen as a part of the reader 100.

Other implementations may provide only handheld or only hands-free configurations. In the embodiment of FIG. 1, the reader 100 is ergonomically configured for a user's hand as a gun-shaped housing 102, though other configurations may be utilized as understood by those of ordinary skill in the art.

For at least some of the reader embodiments, an imaging assembly includes a light-detecting sensor or imager 111 operatively coupled to, or mounted on, a printed circuit board (PCB) 114 in the reader 100 as shown in FIG. 2. In an embodiment, the imager 111 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 115 over a field of view along an imaging axis 117 through the window 108. The return light is scattered and/or reflected from a target 113 over the field of view. The imaging lens assembly 115 is operative for focusing the return light onto the array of image sensors to enable the target 113 to be read. In particular, the light that impinges on the pixels is sensed and the output of those pixels produce image data that is associated with the environment that appears within the FOV (which can include the target 113). The functionality of the reader 100 is controlled by the controller 127 and the captured image data is typically processed by a decoder (also referred to as a decoder module) 128 which identifies and decodes decodable indicial captured in the image data. Either or both controller 127 and the decoder 128 may be referred to as a processor that is local to a reader. Once the decode is performed successfully, the reader can signal a successful "read" of the target 113 (e.g., a barcode) and transmit the read data downstream. The target 113 may be located anywhere in a working range of distances between a close-in working distance (WD1) and a far-out working distance (WD2).

An illuminating light assembly is also mounted in the imaging reader 100. The illuminating light assembly includes an illumination light source, such as at least one light emitting diode (LED) 119 and at least one illumination lens 121, and preferably a plurality of illumination LEDs and illumination lenses, configured to generate a substantially uniform distributed illumination pattern of illumination light on and along the target 113 to be read by image capture. At least part of the scattered and/or reflected return light is derived from the illumination pattern of light on and along the target 113. Further to the illumination assembly, the reader also includes an aiming light source 123, e.g., one or more aiming LEDs or laser light sources, and an aiming lens 125 for generating and directing a visible aiming light beam away from the reader 100 onto the target 113 in the direction of the FOV of the imager 111. The aiming light beam helps direct the operator to point the reader 100 in the correct direction and increase the probability of a successful read.

The imager 111, the illumination source 119, and the aiming source 123 are operatively connected to a controller or programmed microprocessor 127 operative for controlling the operation of these components. A memory 129 is connected and accessible to the controller 127. In some embodiments, the microprocessor 127 is the same as the one used for processing the captured return light from the illuminated target 113 to obtain data related to the target 113. In other examples, a separate decoder module 128 (which may be embodied in a separate electrical circuit and may function either with the use of software, hardware, firmware, or any combination thereof.

Figure 3:
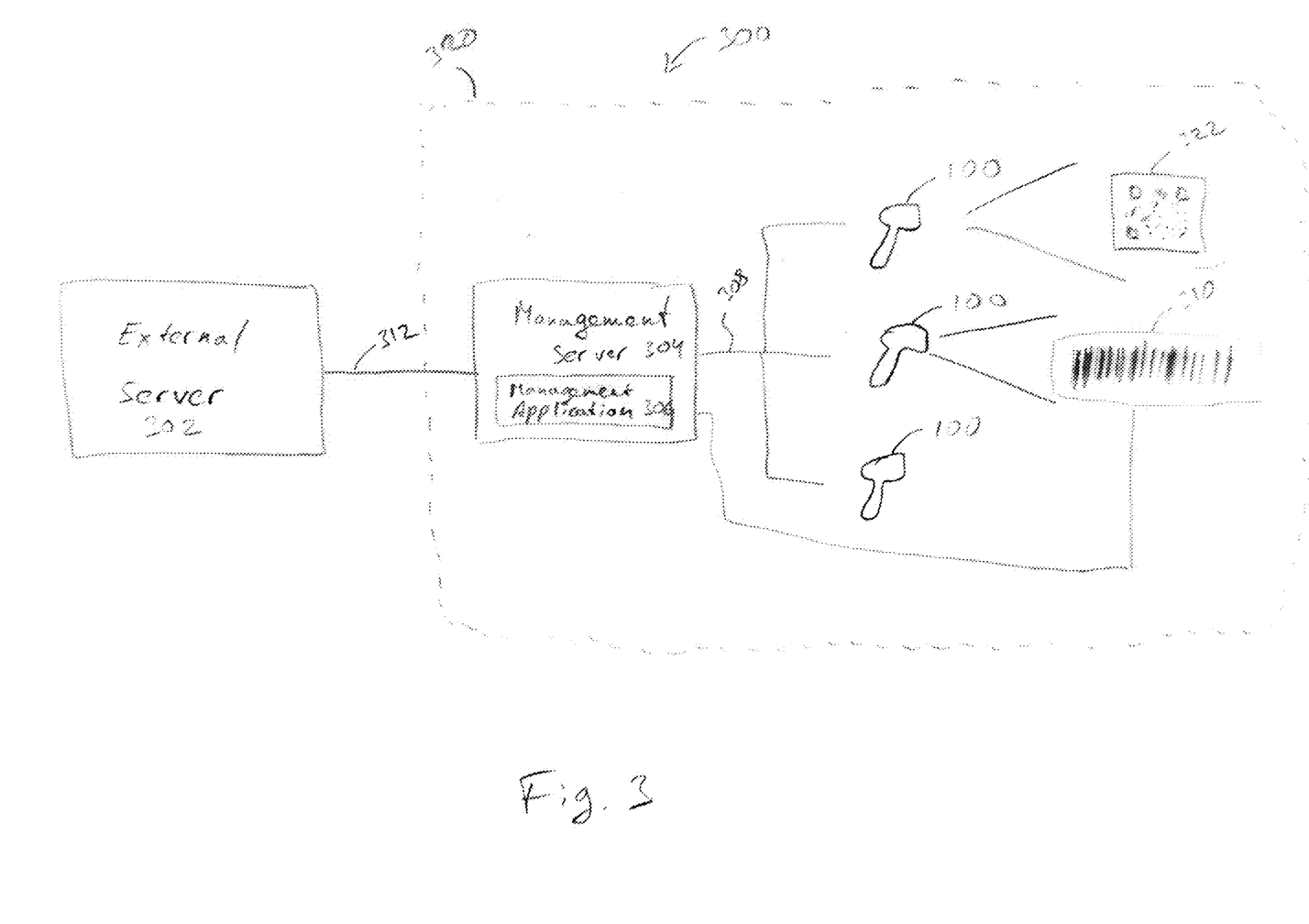
FIG. 3 illustrates a block diagram of an example system for operating a reader of FIG. 1 in accordance with methodologies described in the present disclosure.

Readers, like the reader 100, may be used in a variety of ways to implement the concepts described in the current disclosure. Referring now to FIG. 3, shown therein is a block diagram of an example system 300 for operating readers, like the reader 100, in accordance with methodologies described in the present disclosure. More specifically, the system 300 includes an external server 302, a management server 304, and one or more indicia readers 100.

Addressing the management server 304 and the readers 100, the sever 304 may be embodied in one or more processors operable to execute a management application 306 that allow for some type of management of the readers 100. In an embodiment, server 304 is a computer executing an operating system that allows for further execution of applications like the management application 306. The management application 306 is specifically designed to provide updates and/or configuration data for one or more readers 100 such that the reader 100 operate in accordance with certain parameters. The application 306 may have a graphical user interface through with an operator configures the various parameters that are to be used for the configuration of the readers 100. In some embodiments, the server 304 communicates directly with the reader 100 via a communication interface 308 like the universal serial bus (USB) whereby configuration data is pushed to those devices over the direct communication interface. In other instances, the readers 100 are connected to the server 304 via a hub (like a USB hub) which allows multiple readers 100 to be connected to a single server port. This approach can increase the number of readers that can be connected to the server despite the server having a limited number of connection ports. In various embodiments, the readers 100 have communication limitations such that they lack means for direct TCP/IP communication with its host. As such, in these cases, whether communicating with server 304 or with a host in case of normal barcode decoding operations, the reader's means of communication is limited to some non-internet based means like USB, Serial (RS-232), Bluetooth, NFC, Wi-Fi Direct, BLE, Ethernet (without TCP/IP), Zigbee, Z-Wave, Infrared (IR), 12C, SPI, or CAN Bus. Information transmitted from the management application 306 to the readers 100 can range in complexity and can encompass a wide range of functions including, but not limited to, complete device firmware updates, output data formatting, operational behavior parameters, etc.

In some cases, particularly in those where physically connecting the readers 100 to the server 304 may be undesirable or impossible, the management application 306 can format a configuration barcode 310 that can be presented to the readers 100 for configuration thereof. Barcode 310 can be any type of a barcode that is decodable by the reader 100 (e.g., Universal Product Code, an EAN, Code 39, Code 128, ITF, Codabar, QR Code, Data Matrix, PDF417, Aztec Code, MaxiCode, etc.) and can be presented to the readers 100 either on a printed medium like paper or on a screen of an electronic device. With a configuration barcode like barcode 130 configuration data is encoded as the payload thereof along with information that signals to the reader 100 that barcode 310 is a configuration code. Upon decoding this barcode, reader interprets the configuration command and reconfigures itself based on the configuration data provided in the barcode. In this manner, the application 306 provides an indirect means for configuring of barcode readers 100.

While configuration data may be manually entered into the management application 306 by the operator thereof, it can also be received from another upstream server like an external server 302. As with the management server 304, external server 302 is generally comprised of one or more processors capable of executing various computing applications. The external server 302 and the management server 304 can be connected via any type of connectivity means 312 which would enable the transfer of information, and can include any combination of wired and wireless networks, including Ethernet, Wi-Fi, cellular networks (e.g., 4G, 5G), Bluetooth, fiber optic connections, satellite links, or other internet-based or local area network (LAN) connections. As such, the external server 302 may transmit configuration data down to the management server 304 and the management application 306, which in turn can further be used to configure the readers 100 as described above.

Applying the foregoing configuration to a real-world non-limiting example, the system 300 may be seen as being implemented in a grocery venue 320 with the readers 100 and the management server 304 being under the control of said venue. In some instances, it would be desirable to identify certain barcodes of interest within the venue using the readers 100. This can be particularly useful in cases where only a subset of items is expected to be recognized such that relying on a traditional barcode like the UPC will be insufficient. For instance, there may be cases where a specific batch of lettuce from a supplier may need to be identified (for example, for recall purposes) in a way where only that batch is flagged rather than every batch from that supplier. Traditionally, this would be impossible to do when relying on barcodes like the UPC which simply encode manufacturer and product codes. Leveraging the GD1 Digital Link format can help alleviate this problem.

The GS1 Digital Link is a URL-based structure that embeds essential product information, facilitating seamless interaction with product data through web-enabled devices such as smartphones. It can be presented in a form of a QR barcode or other 2D barcode, encoding the necessary information therein. This structure begins with a base URL, often specific to a brand or product database, such as https://id.gs1.org/or a company-specific domain (e.g., https://example.com/id/). Following the base URL, an identifier type is specified to denote the kind of information being conveyed. Common identifiers include/gtin/for the Global Trade Item Number (GTIN), /itip/for trade item piece-level identifiers, /cpid/for Consumer Product Identifiers, /gln/for Global Location Numbers, and/party/to specify particular companies or entities.

The unique identifier, typically the GTIN, follows the identifier type to uniquely identify the product within the digital link, as in the example https://id.gs1.org/gtin/0123456789123. Further optional parameters can be appended to provide additional information, such as lot=XXXX for batch or lot numbers, serial=XXXX for item-specific serial numbers, exp=YYYY-MM-DD for expiration dates, auth=XXXX for authentication tokens, and lang=en to specify a preferred language. For instance, a complete digital link could be structured as https://id.gs1.org/gtin/0123456789123/lot/4567/serial/890123/exp/2024-12-31, where the GTIN identifies the product, and additional parameters specify batch number 4567, serial number 890123, and expiration date 2024 Dec. 31.

Given that the GS1 Digital Link format includes the optional parameters like the lot number, serial number, and expiration date, identifying subsets of specific products is possible. This, however, is problematic with non-web-enabled devices (like the so-called dumb barcode readers) which cannot, in real-time, check these parameters against a flagged set. The system and methods of the present disclosure address this problem via a novel approach.

Figure 4:
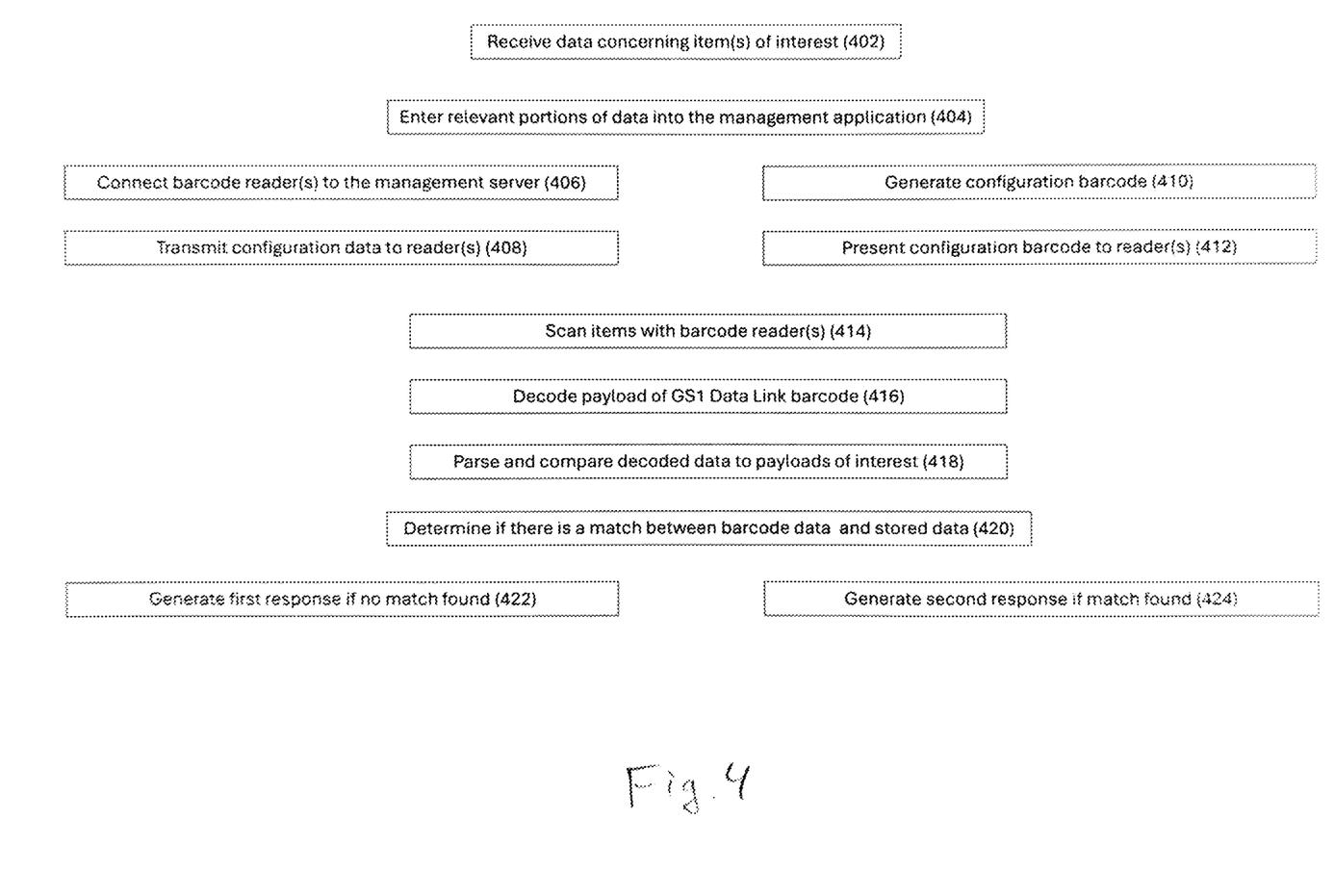
FIG. 4 illustrates a representative example flowchart of the process-flow of the example system of FIG. 3.

Returning to the example of a grocery store venue and further referring to FIG. 4 which illustrates a representative example flowchart of the process-flow 400 of the example system 300 of the present disclosure, there may be an instance where a particular lettuce distributor, Lettuce Distributor Co, has identified that lot number 4567 of its romaine lettuce, identifiable by the GTIN 0123456789123, has been effected by a potential *E-coli* outbreak and needs to be recalled. In this case, the external server 302, which can belong to Lettuce Distributor Co, can transmit appropriate information to the management server 304 indicating the effected GTIN and lot number. Alternatively, information concerning a particular product and product parameter (lot/sn/expiration date/etc) along with the specifics of which products are affected can be manually received through virtually any channel by the operator of the management server 304 and/or management application 306.

Upon receiving 402 the appropriate data concerning the item(s) of interest, relevant portions of this data are entered 404 into the management application 306. In a preferred embodiment, at least the GTIN data and one of the optional parameters for identifying unique subsets of particular items are provided to the management application 306 to enable proper identification of the appropriate items later in the process flow. For instance, continuing with the foregoing example, the GTIN 0123456789123 of Lettuce Distributor Co and romaine lettuce along with lot number 4567 are entered into the management application 306. At this point, the management application 306 can be used to configure the barcode reader(s) 100 to specifically identify GS 1 Data Link barcodes that include these parameters.

As described previously, the configuration can be achieved either by electronic transmission of configuration data or by way of providing a configuration barcode for reading by the reader(s) 100. In case of electronic transmission configuration, an operator connects 406 the reader(s) 100 to the management server 304 and transmits 408 the appropriate data to those readers for further use by the respective reader(s). In case of configuration via a barcode, the operator generates 410 the appropriate configuration barcode 310 via the management application 306 and thereafter presents 412 said barcode 310 to all necessary readers 310, whereby upon reading the barcode, each reader 100 is configured accordingly.

This process results in the barcode readers 100 receiving, from the device-management application 306, a list of payloads of interest to be stored in the local memory of the barcode reader where each of these payloads ends up being associated with a GS1 Digital Link barcodes of interest. Thus, continuing with the example of the grocery store, going through the configuration process 406,408 or 410,412 results in the GTIN 0123456789123 and lot number 4567, in association with each other, being stored in the readers 110.

It should be appreciated that references to "a list of payloads of interest" may include one or more payloads. Thus, with the current examples, there being only a single effected lot, the list of payloads of interest includes only one payload. In other instances, the list may include multiple payloads like multiple lot numbers, multiple serial numbers, multiple expiration dates, and any combinations thereof. Additionally, references to the payload does not necessarily have to refer to an entire payload of a GS1 Digital Link barcode. In other words, payload information received from the management application 306 may be just a part of the overall payload of a GS1 Digital Link barcode. For example, the GTIN 0123456789123 and lot number 4567 received from the application 306 may still be considered a payload of interest as it related to a GS1 Digital Link barcode having an overall encoded payload of https://id.gs1.org/gtin/0123456789123/lot/4567/serial/890123/exp/2024-12-31.

The data associated payloads of interest is transmitted or decoded with the use of a configuration barcode in conjunction with a configuration parameter which indicates that the reader 100 is to identify a GS1 Digital Link code comprising the payload of interest in a manner that is different from identifying other GS1 Digital Link codes that do not comprise the payload of interest. In other words, the configuration of the reader results in the reader being able to distinguish between GS1 Digital Link barcodes of interest and other GS1 Digital Link codes.

Returning to the flowchart 400 of FIG. 4, upon a successful configuration of the readers 100, venue operators begin to use readers 100 in their normal course of business, scanning 414 items in inventory by capturing images of the items' respective GS1 Digital Link barcodes 322 for the reader to decode the respective payloads and act accordingly. With each successful scan (aka read) of the barcode 322, the payload of this barcode is decoded 416 via the decoder module as described previously. This results in the reader 100 having appropriate barcode component information that was encoded in the barcode 322 allowing it to further parse 418 that data for processing in accordance with the present disclosure.

Assuming that in one example, the QR code of the scanned GS1 Digital Link 322 had a payload of https:// id.gs1.org/gtin/0123456789123/lot/4567/serial/890123/exp/2024-12-31, the reader 100 can parse the data to focus on any one or more of the GTIN, lot number, serial number, and expiration date. This data is then compared to the payloads of interest to identify the codes of interest.

It should be appreciated that while the exemplary process describes the parsing of the decoded data, this step is optional in a sense that other comparison methodologies may be applies. In some instances, the entire payload of a would-be decoded GS1 Digital Link code of interest may be passed down from the management application 306 to the readers 100 in the form of the payload(s) of interest. Then, no parsing may be necessary, and the decoded payload of code 322 may simply be compared to the payload of interest to determine if there is a match. In other cases, the presence of a payload of interest may simply be searched for within the entire decoded payload of the code 322. This, however, may be less desirable as a payload of interest may appear in multiple fields, leading to inaccurate match determinations.

Nevertheless, upon having the decoded payload of the GS1 Digital Link barcode 322, the reader determines whether there is a match 420 between any one of the payloads of interest stored in its local memory and the payload of the barcode 322. This includes a comparison of the payload of interest to the entire payload of the barcode 322 or a portion of the payload of the barcode 322. Thus, a comparison of a decoded payload of the GS1 Digital Link barcode present in the image of a reader 100 to one of the payloads of interest in the memory of the barcode reader 100 includes a comparison just certain elements of the decoded payload to the one of the payloads of interest, like a comparison of the GTIN and the lot number of the code 322 to the payload stored in the memory of the reader.

When a reader captures an image having a GS1 Digital Link barcode 322, decodes its payload, and determines that relevant portions thereof do not match the payload(s) of interest, the reader generates a first type of response 422. This can include, but is not limited to, generating an auditory response indicative of a successful decode of a barcode where the auditory response has a first profile (e.g., a single beep, a beep of a certain duration, a varying tone, etc.), generating a visual indicator indicative of a successful decode of a barcode where the visual indicator has a first profile (e.g., single flash, flash of a certain duration, flash having a green color, etc.), generating a haptic response indicative of a successful decode of a barcode where the haptic response has a first profile (e.g., a single vibration, a vibration or a certain duration, a varying vibration, etc.), generating a payload that is sent to a host device that does not include an indication of the code 322 having a match to one of the codes of interest. Thus, if the barcode 322 included the payload https://id.gs1.org/gtin/0123456789123/lot/1234/serial/890123/exp/2024-12-31, a match would not be found since, despite the GTIN having a match to the GTIN of interest, the lot number 1234 does not match the lot of interest 4567.

On the other hand, when a reader captures an image having a GS1 Digital Link barcode 322, decodes its payload, and determines that relevant portions thereof do match the payload(s) of interest, the reader generates a second type of response 424 that is different to the first response. This can include, but is not limited to, generating an auditory response indicative of a successful decode of a barcode of interest where the auditory response has a second profile (e.g., a double beep, a beep of a certain longer duration, a varying tone, etc.), generating a visual indicator indicative of a successful decode of a barcode of interest where the visual indicator has a second profile (e.g., double flash, flash of a certain longer duration, flash having a red color, etc.), generating a haptic response indicative of a successful decode of a barcode of interest where the haptic response has a second profile (e.g., a double vibration, a vibration or a certain longer duration, a varying vibration, etc.), generating a payload that is sent to a host device that does include an indication of the code 322 having a match to one of the codes of interest. Thus, if the barcode 322 included the payload https://id.gs1.org/gtin/0123456789123/lot/4567/serial/890123/exp/2024-12-31, a match would be found since both the GTIN and lot number match the payload of interest which is comprised of the GTIN 0123456789123 and lot number 4567.

Receiving the either of the first or second responses can allow the reader operator to take appropriate action with respect to the item of interest. In the example of the recall of the lettuce having GTIN 0123456789123 and lot number 4567, the reader operator may immediately realize that the item that was just scanned falls within the list of items that should be pulled off the shelf.

It should be appreciated that the concepts described herein are not limited to identifying items for recall purposes and a variety of other underlying factors may employ the processes and systems described herein. For example, the venue operator may wish to conduct inventory of items of certain lots/serial number batches/and/or date ranges. These parameters may be programmed into the management application 306 by the venue operator, causing the reader(s) 100 to react appropriately when items bearing the GS1 Digital Link codes of interest are scanned. In other cases, there may be a need to identify items that have a certain expiration date to ensure that those items are pulled off the shelf or identified for some other purpose like a price markdown. Once again these parameters can be programmed into the management application 306 and pushed down to the readers 100 such that when those readers encounter the codes of interest, the device is able to effectively make note of this and/or send a distinct signal to the operator and allow the operator to take appropriate action.

It should also be appreciated that the concepts described herein are particularly useful in the context of non-web enabled devices which are unable to inherently utilize the GS1 Digital Link functionality which requires communication with remote web-based host. Unlike advanced mobile computer that have built-in internet connectivity, readers like the reader 100 are not operable to transmit data beyond an immediate host. This typically includes conventional readers like handheld gun-shaped readers, presentation readers, single plane (slot scanner) readers, and bi-optic readers. This creates a problem to being able to effectively react to the data provided in the GS1 Digital Link barcode and the solutions disclosed herein address that problem. Not only does this approach provide a solution to a previously unsolved problem, but it also provides the benefit of not having to rely on an internet connection to perform the necessary checks. Not having to rely on an internet connection can increase both performance speed and reliability, enabling operators to more effectively and efficiently perform their jobs. Furthermore, while the approaches here have been discussed in the context of non-web-enabled devices, the same approach can also be applied to web-enabled devices whereby the appropriate data of interest is stored in local memory rather than requiring the device to issue queries to an internet-based server. As a result, this approach can further increase the reliability and performance of readers even if they have connectivity means for performing real-time internet-based communications in connection with barcode scans.

Finally, it should also be appreciated that while this disclosure has made references to the GS1 Digital Link barcode and the readers' use thereof, the concepts describe here equally extend to any other web-based indicia which may include information that requires an internet query.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for identifying GS1 Digital Link barcodes of interest, comprising:
   a server configured to execute a device-management application; and
   a barcode reader having a local processor and a local memory, the barcode reader being configured to decode a GS1 Digital Link barcode to obtain a payload,
   wherein:
      the barcode reader is operable to be managed by the device-management application;
      the barcode reader receives, from the device-management application, a list of payloads of interest to be stored in the local memory of the barcode reader, each of the payloads of interest being associated with one of the GS1 Digital Link barcodes of interest;
      responsive to decoding a GS1 Digital Link barcode present in an image captured by the barcode reader and determining that a decoded payload of the GS1 Digital Link barcode present in the image matches one of the payloads of interest, generating a first response;
      responsive to decoding the GS1 Digital Link barcode present in the image captured by the barcode reader and determining that the decoded payload of the GS1 Digital Link barcode present in the image does not match one of the payloads of interest, generating a second response; and
      the determining if the decoded payload of the GS1 Digital Link barcode present in the image matches or does not match one of the payloads of interest is done by comparing the decoded payload of the GS1 Digital Link barcode present in the image to the list of payloads of interest stored in the local memory of the barcode reader by the local processor.

2. The system of claim 1, wherein the barcode reader is not operable to transmit data beyond an immediate host.

3. The system of claim 1, wherein the barcode reader receives, from the device-management application, the list of payloads of interest by capturing one or more images of one or more indicia generated by the device-management application, and
   wherein the one or more indicia generated by the device-management application is based on the payloads of interest that are associated with one of the GS1 Digital Link barcodes of interest.

4. The system of claim 1, wherein the barcode reader receives, from the device-management application, the list of payloads of interest by a network transmission from the device-management application to the barcode reader.

5. The system of claim 1, wherein the first response includes generating a first audible tone, and wherein the second response includes a second audible tone that is longer in duration than the first audible tone.

6. A system for identifying GS1 Digital Link barcodes of interest, comprising:
   a server configured to execute a device-management application; and
   a barcode reader having a local processor and a local memory, the barcode reader being configured to decode a GS1 Digital Link barcode to obtain a payload,
   wherein:
      the barcode reader is operable to be managed by the device-management application;
      the barcode reader receives, from the device-management application, a dataset having one or more entries to be stored in the local memory of the barcode reader, the dataset being associated with the GS1 Digital Link barcodes of interest such that for each one of the GS1 Digital Link barcodes of interest the dataset includes an entry having at least a portion of a payload of the respective one of the GS1 Digital Link barcodes of interest;
      responsive to decoding a GS1 Digital Link barcode present in an image captured by the barcode reader and determining that at least a portion of a decoded payload of the GS1 Digital Link barcode present in the image matches the one or more entries of the dataset, generating a first response;
      responsive to decoding the GS1 Digital Link barcode present in the image captured by the barcode reader and determining that the at least the portion of the decoded payload of the GS1 Digital Link barcode present in the image does not match the one or more entries of the dataset, generating a second response; and
      the determining if the at least the portion of the decoded payload of the GS1 Digital Link barcode present in the image matches or does not match the one or more entries of the dataset is done by comparing the at least the portion of the decoded payload of the GS1 Digital Link barcode present in the image to the entries of the dataset stored in the local memory of the barcode reader by the local processor.

7. The system of claim 6, wherein the barcode reader is not operable to transmit data beyond an immediate host.

8. The system of claim 6, wherein the barcode reader receives, from the device-management application, the dataset by capturing one or more images of one or more indicia generated by the device-management application, and
   wherein the one or more indicia generated by the device-management application is based on one of the GS1 Digital Link barcodes of interest.

9. The system of claim 6, wherein the barcode reader receives, from the device-management application, the dataset by a network transmission from the device-management application to the barcode reader.

10. The system of claim 6, wherein the first response includes generating a first audible tone, and wherein the second response includes a second audible tone that is longer in duration than the first audible tone.

11. The system of claim 6, wherein each entry of the dataset includes at least one of a Global Trade Item Number, a product identifier, or a unique item identifier associated with one of the one of the GS1 Digital Link barcodes of interest.

12. A barcode reader for identifying GS1 Digital Link barcodes of interest, the barcode reader being configurable via a device-management application executing on a server, the barcode reader comprising:
  a local processor; and
  a local memory, the barcode reader being configured to decode a GS1 Digital Link barcode to obtain a payload, wherein:
    the barcode reader is operable to be managed by the device-management application;
    the barcode reader receives, from the device-management application, a dataset having one or more entries to be stored in the local memory of the barcode reader, the dataset being associated with the GS1 Digital Link barcodes of interest such that for each one of the GS1 Digital Link barcodes of interest the dataset includes an entry having at least a portion of a payload of the respective one of the GS1 Digital Link barcodes of interest;
    responsive to decoding a GS1 Digital Link barcode present in an image captured by the barcode reader and determining that at least a portion of a decoded payload of the GS1 Digital Link barcode present in the image matches the one or more entries of the dataset, generating a first response;
    responsive to decoding the GS1 Digital Link barcode present in the image captured by the barcode reader and determining that the at least the portion of the decoded payload of the GS1 Digital Link barcode present in the image does not match the one or more entries of the dataset, generating a second response; and
    the determining if the at least the portion of the decoded payload of the GS1 Digital Link barcode present in the image matches or does not match the one or more entries of the dataset is done by comparing the at least the portion of the decoded payload of the GS1 Digital Link barcode present in the image to the entries of the dataset stored in the local memory of the barcode reader by the local processor.

13. The barcode reader of claim 12, wherein the barcode reader is not operable to transmit data beyond an immediate host.

14. The barcode reader of claim 12, wherein the barcode reader receives, from the device-management application, the dataset by capturing one or more images of one or more indicia generated by the device-management application, and
  wherein the one or more indicia generated by the device-management application is based on one of the GS1 Digital Link barcodes of interest.

15. The barcode reader of claim 12, wherein the barcode reader receives, from the device-management application, the dataset by a network transmission from the device-management application to the barcode reader.

16. The barcode reader of claim 12, wherein the first response includes generating a first audible tone, and wherein the second response includes a second audible tone that is longer in duration than the first audible tone.

17. The barcode reader of claim 12, wherein each entry of the dataset includes at least one of a Global Trade Item Number, a product identifier, or a unique item identifier associated with one of the one of the GS1 Digital Link barcodes of interest.

18. A method for identifying GS1 Digital Link barcodes of interest using a barcode reader, the method comprising:
  receiving, by the barcode reader from a device-management application, a dataset having one or more entries and storing the data in a local memory, the dataset being associated with GS1 Digital Link barcodes of interest, wherein each entry includes at least a portion of a payload of a respective GS1 Digital Link barcode of interest;
  configuring the barcode reader via the device-management application executing on a server;
  decoding, by a local processor of the barcode reader, a GS1 Digital Link barcode captured in an image to obtain a payload;
  determining if at least a portion of the decoded payload of the GS1 Digital Link barcode captured in the image matches one or more entries of the dataset by comparing the decoded payload to the entries stored in the local memory;
  generating a first response if the portion of the decoded payload matches the one or more entries of the dataset; and
  generating a second response if the portion of the decoded payload does not match the one or more entries of the dataset.

19. The method of claim 18, further comprising restricting the barcode reader from transmitting data beyond an immediate host.

20. The method of claim 18, wherein receiving the dataset comprises capturing one or more images of indicia generated by the device-management application, the indicia being based on one of the GS1 Digital Link barcodes of interest.

21. The method of claim 18, wherein receiving the dataset comprises a network transmission from the device-management application to the barcode reader.

22. The method of claim 18, wherein generating the first response includes emitting a first audible tone, and generating the second response includes emitting a second audible tone that is longer in duration than the first audible tone.

23. The method of claim 18, wherein each entry of the dataset includes at least one of a Global Trade Item Number, a product identifier, or a unique item identifier associated with a GS1 Digital Link barcode of interest.

* * * * *